United States Patent Office 2,980,021
Patented Apr. 18, 1961

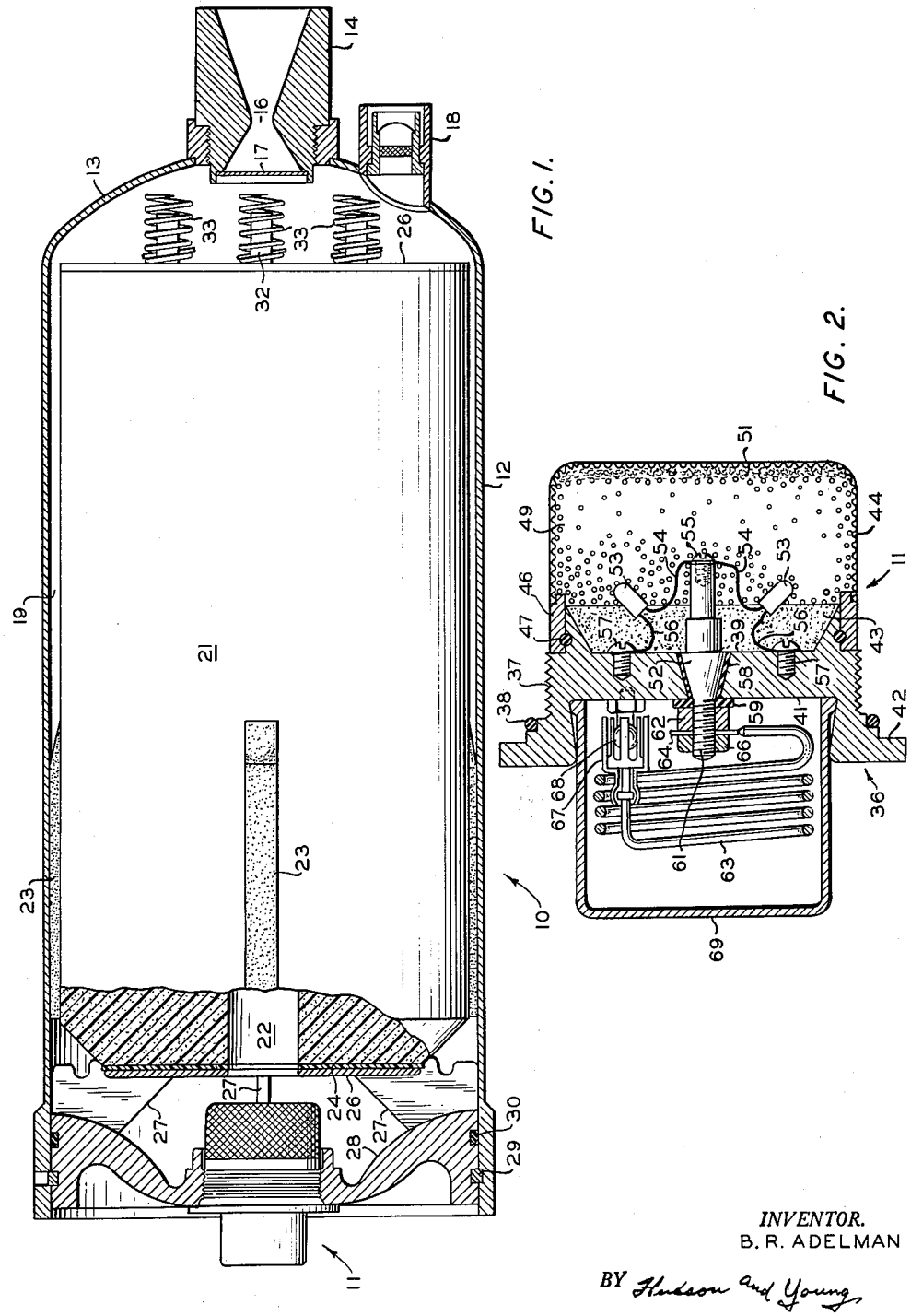

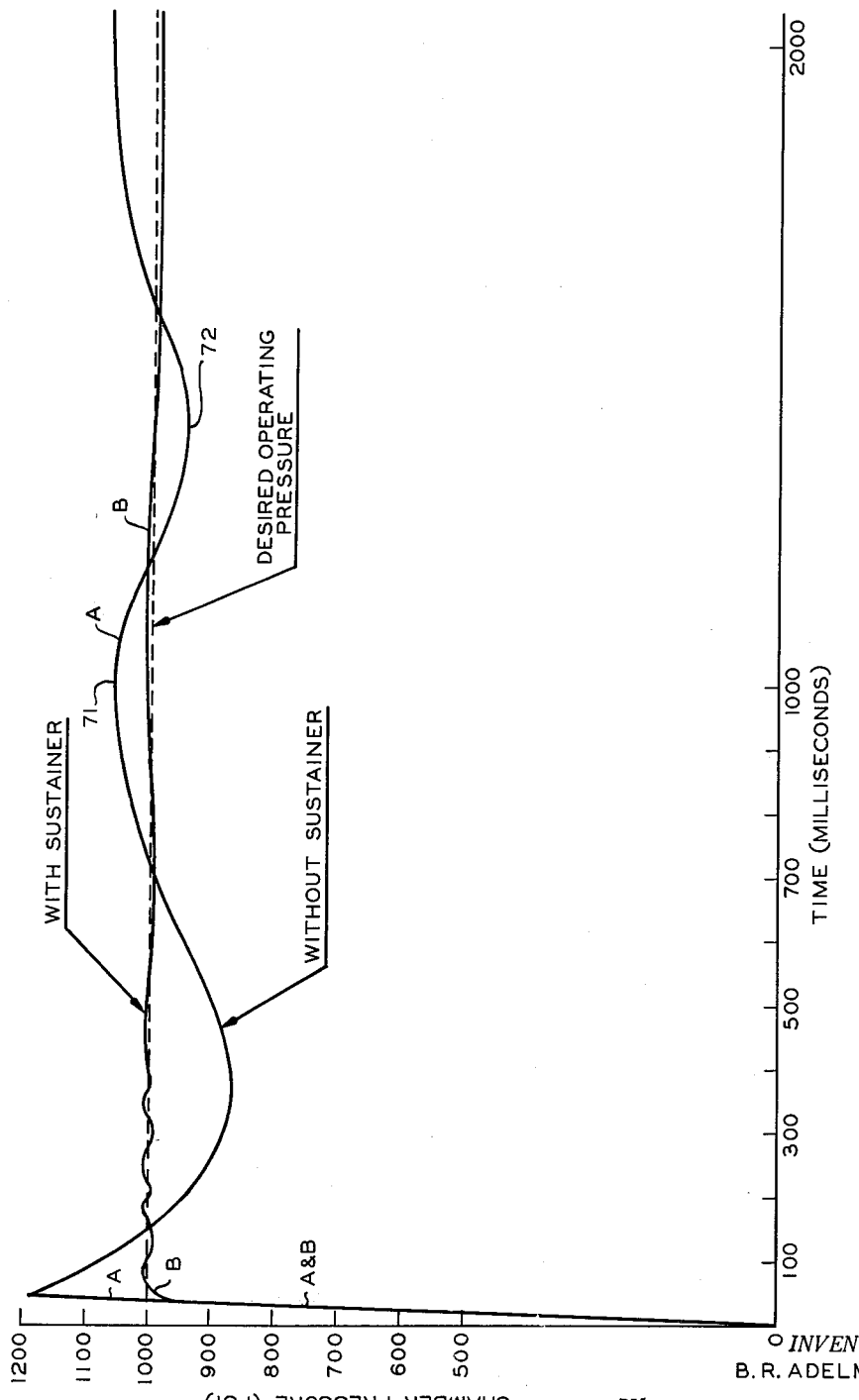

2,980,021

IGNITION OF SOLID ROCKET PROPELLANTS

Barnet R. Adelman, Los Angeles, Calif., assignor to Phillips Petroleum Company, a corporation of Delaware Filed June 14, 1956, Ser. No. 591,340

2 Claims. (Cl. 102—70.2)

This invention relates to solid rocket propellants. In one aspect, the invention relates to an improved means for igniting solid rocket propellants. In another aspect, the invention relates to an improved method for operating a rocket motor employing a solid propellant charge. In still another aspect, the invention relates to a novel propellant composition for use as an ignition sustainer in the operation of a solid propellant rocket motor.

In recent years, considerable work has been directed toward the development of solid rocket propellants suitable for use in rocket motors. Rockets employing solid propellant fuels are extensively used by the military and have also achieved considerable importance in commercial operation. For example, solid rocket propellants are utilized in missiles, projectiles, and rockets to assist planes in take-off or to furnish an extra surge of power in flight.

Solid propellants used in rockets, such as JATO units, comprise a fuel and an oxidant for oxidizing the fuel. Ammonium nitrate and ammonium perchlorate are frequently employed as the oxidant whereas the fuel component is generally a hydrocarbon material which serves as a binder for bonding the solid oxidant particles into a solid grain as well as acting as a fuel. Materials suitable for use as the binder include asphalt, rubber and other tacky hydrocarbon-containing materials.

Recently, superior solid propellant materials have been discovered which comprise a major proportion of a solid oxidant, such as ammonium nitrate or ammonium perchlorate, and a minor amount of a rubbery binder material, such as a copolymer of a conjugated diene and a vinylpyridine or other substituted heterocyclic nitrogen base compound, which after incorporation is cured by a vulcanization reaction. Solid propellant mixtures of this nature and a process for their production are disclosed and claimed in copending U.S. application Serial No. 284,447, filed April 25, 1952, by W. B. Reynolds and J. E. Pritchard. While it is not intended to so limit the instant invention, it is especially applicable to rocket motors which employ these solid propellant materials.

These novel solid propellant mixtures, especially in cases where ammonium nitrate is utilized as the solid oxidant, are inherently difficult to ignite. Ammonium nitrate-binder propellants have a relatively high auto-ignition temperature of about 600° F. The propellants are also highly susceptible to changes in pressure, and a pressure of about 200 p.s.i. is generally required in order to sustain combustion. The specific heats of the propellants are high, but their heat transfer coefficients are low. Accordingly, in order to maintain a steady and uniform combustion so as to obtain a desired uniform operating pressure, it has been found to be necessary to provide sufficient heat to maintain a hot zone, e.g., approximately ⅛" thick, below the burning surface of the propellant.

When operating a solid propellant rocket motor, it is important for optimum results that the solid propellant charge burn at its predetermined designed mass burning rate (pounds of propellant per second). When a propellant burns at its designed mass burning rate, a substantially constant chamber pressure is produced so that a uniform thrust is developed. One of the factors effecting the mass burning rate is the linear burning rate of the propellant expressed in inches per second. The linear burning rate is pressure-sensitive so that the greater the chamber pressure the greater the rate of burning and vice versa. When operating with an igniter charge without the sustainer charge of this invention, the combustion chamber pressure initially developed by combustion of the propellant charge is insufficient to maintain a great enough linear burning rate so as to obtain the desired, designed mass burning rate. As a result, fluctuating combustion chamber pressures are obtained, thereby causing the development of a non-uniform thrust. And in some cases, the chamber pressure developed may drop low enough, e.g., below 200 p.s.i., to cause a misfire. In order to obtain initially a linear burning rate such that the propellant will burn at its desired mass burning rate, it has been found to be necessary to provide means for maintaining a hot zone adjacent the propellant burning surfaces. In accordance with the instant invention, means are provided for igniting solid propellant charges so that a substantially constant combustion chamber pressure is obtained throughout the firing period.

It is an object of this invention to provide an improved igniter assembly for use with rocket motors employing solid propellant charges.

Another object of the invention is to provide an improved method for operating solid propellant rocket motors.

Still another object of the invention is to provide a propellant composition especially adapted for use as an ignition sustainer in the operation of a solid propellant rocket motor.

A further object of the invention is to provide an improved method for igniting solid rocket propellants at temperatures in the range of —75° F. and below to 170° F. and above so that the propellant will burn at its designed mass burning rate with no severe ignition delays or unacceptable pressures.

A still further object of the invention is to provide an improved rocket motor which is not subject to misfires.

Other and further objects and advantages of the invention will become apparent to those skilled in the art upon consideration of the accompanying disclosure.

Broadly speaking, the instant invention resides in an improved means and method for igniting solid propellant charges. More specifically, the ignition means comprises an igniter material encased in a perforated container or wire basket, and ignition sustaining material capable of producing a relatively large volume of hot combustion gases, the sustaining material being disposed adjacent the igniter material, and means for igniting the igniter material. In accordance with the method of this invention, improved ignition of a solid propellant charge enclosed in a rocket motor combustion chamber is obtained by initially igniting a primary igniter material so as to establish a desired working pressure in the combustion chamber and initiate combustion of at least part of the burning surfaces of the propellant charge and thereafter igniting an ignition sustainer material so as to direct hot combustion gases over the propellant burning surface during the initial part of the firing period. By providing these hot combustion gases, the deficiency in chamber pressure existing during the initial part of the firing period is compensated for until stable propellant burning surfaces have been established and equalized, i.e., until a hot zone has been established below the burning surfaces of the propellant.

In accordance with another embodiment of the invention, a novel propellant composition is provided which has been found to be especially adapted for use as the ignition sustaining material. This propellant composition comprises (1) an inorganic oxidizing agent such as one selected from the group consisting of ammonium perchlorate and potassium perchlorate, (2) a rubbery binder such as a polysulfide polymer binder, and (3) a finely divided metal such as one selected from the group consisting of aluminum, magnesium and titanium.

A more complete understanding of the invention can be obtained by referring to the following description and the drawings, in which:

Figure 1 is an elevation, partly in section, of a rocket motor which includes the igniter assembly of this invention;

Figure 2 is an elevation, partly in section, of a preferred embodiment of the igniter assembly; and Figure 3 is a graph illustrating advantages of employing the sustainer of this invention in the ignition of a solid propellant charge.

Referring now to the drawing, and in particular to Figure 1, there is illustrated a rocket motor 10 which includes igniter assembly 11 of the instant invention. The rocket motor comprises a cylindrical casing 12 which has a reduced after portion 13 having an axial opening into which an exhaust nozzle 14 is threaded. The nozzle is formed with internal restrictions so as to define a venturi-like passage 16 through which the combustion gases pass. A blow-out diaphragm or disk 17, which covers the inner opening into passage 16, is designed so as to be ejected through the nozzle passage when the chamber pressure reaches a predetermined value, e.g., between 200 and 500 p.s.i. The reduced casing portion of the rocket motor is also provided with a safety plug attachment 18 which is adapted to rupture at a predetermined chamber pressure. By providing for this attachment, the buildup of excessive pressures in the combustion chamber which might rupture the cylindrical casing of the rocket motor is prevented. Any suitable device for releasing excessive pressure can be utilized as is well known to those skilled in the art.

The cylindrical casing defines a combustion chamber 19 in which the solid propellant charge 21 is disposed. The specific propellant charge illustrated is cylindrical in shape and has an outer diameter smaller than the inner diameter of the casing. The propellant is an internal-external burning type by reason of its exposed or unrestricted outer surface and its inner exposed surface which is defined by an axial perforation 22 extending the length of the propellant. A plurality of resilient retaining pads 23, e.g., strips of sponge rubber, are positioned between the head portion of the external burning surface and the adjacent head portion of the casing. The ends of the propellant are restricted by means of a layer of restricting material 24 which has a central opening in alignment with perforation 22. Retaining plates 26 having similar openings cover the outside of the restricting material. Secured to the head retaining plate are outer-extending prongs or legs 27 which are adapted to register with and are held in place by head closure assembly 28 having retention means for igniter assembly 11. Head closure assembly 28 is held in position in the head end of casing 12 by means of key 29 which fits into appropriate grooves formed in the casing and head closure assembly 28. A sealing ring 30 in position in a groove cut into assembly 28 to prevent escape of combustion gases from the head end of the casing. The head end of the cylindrical casing is closed by means of head closure assembly 28 in combination with the igniter assembly which is retained in the opening provided in the axial portion of assembly 28. It is noted that the removable cover of the igniter assembly extends through this axial opening.

The after retaining plate has secured to its outer surface a plurality of prongs 32. The prongs are each surrounded by a compression spring 33 adapted to come into contact with the reduced portion 13 of the casing. The after retaining plate is thereby maintained firmly against the restricting material which covers the after end of the solid propellant.

Referring now to Figure 2 of the drawing, there is illustrated in detail the various elements of igniter assembly 11. The igniter assembly comprises an igniter plug 36 which is provided with external threads 37. As shown in Figure 1, these threads provide means for securing the plug in head closure assembly 28 attached to the head end of the rocket motor casing. An O-ring 38, which comes into contact with assembly 28 when the igniter assembly is placed in the rocket motor, furnishes a gas-tight seal for the head end of the motor. The inner and outer faces 39 and 41, respectively, of the igniter plug are counter-sunk so as to form recessed portions or cavities in the ends of the plug. The outer end of the plug is provided with shoulders 42 which are in contact with head closure assembly 28 when the igniter assembly is in position as shown in Figure 1.

Disposed within the inner recessed portion or cavity of the igniter plug is an ignition sustaining material 43. The ignition sustaining material is in general a propellant composition which is relatively easy to ignite and capable of furnishing hot combustion gases during the initial part of the firing period. Preferably, the material is capable of delivering combustion gases during at least the initial 500 milliseconds of the firing period. While it is within the scope of the invention to employ any suitable propellant composition which fulfills these requirements, a composition comprising a mixture of (1) an oxidant such as ammonium perchlorate or potassium perchlorate, (2) a polysulfide polymer binder, and (3) a finely divided metal such as aluminum, magnesium, or titanium has been found to be especially suitable for use as an ignition sustaining material. A preferred sustainer formulation comprises between 60 and 75 weight percent of an oxidizer, such as potassium perchlorate, between 5 and 25 weight percent of finely divided metal, such as aluminum, and between 10 and 40 weight percent of polysulfide polymer binder. The oxidizer is utilized in finely divided form, e.g., 100 to 250 mesh, while the elemental metal is in the form of a powder preferably having a mesh size between 250 and 325. It is preferred to use potassium perchlorate as the oxidizer because of the very hot combustion gases produced when this material is included in the sustainer formulation. It is also within the purview of the invention to employ other inorganic oxidizing materials such as barium nitrate, potassium nitrate, sodium nitrate, sodium perchlorate and other alkali metal perchlorates. The polysulfide polymer serves as the fuel as well as the binder for the propellant composition. It is also within the scope of the invention to use other rubbery polymers as the binder material, such as neoprene, GR–S rubber, and copolymers of a conjugated diene and a vinylpyridine, such as disclosed in the above cited Reynolds and Pritchard application. However, it is preferred to use a polysulfide polymer because it can be readily molded and cured at low temperatures, e.g., room temperature.

Polysulfide polymers which can be used as the binder are sold by the Thiokol Chemical Corporation, Trenton, New Jersey, and are generally known in the trade as Thiokol rubber. The polymers which can be used are also further designated as LP–2, LP–3, LP–8, LP–32 and LP–33, depending upon the degree of cross-linking and the degree of polymerization. For a more complete description of the polysulfide polymers which can be employed as the binder material, reference may be had to "Materials and Methods," 41, pages 110–113 (May 1955).

Although it is not intended to limit the invention to a particular binder composition, a particularly useful one is set forth hereinbelow.

BINDER FORMULATION

| | Parts by weight |
|---|---|
| LP-3 [1] | 7.5-37.5 |
| Diphenyl guanidine (accelerator) | 0.5-1.5 |
| p-Quinone dioxime (curing agent) | 1.0-3.0 |
| Di-(butoxyethoxyethoxy)-naphthene (plasticizer) | 0-3.0 |
| Sulfur (curing agent) | 0-0.5 |
| Carbon black (filler) | 1.0-10 |
| MgO | 0-0.5 |
| $Fe_2O_3$ | 0-0.5 |

[1] A polysulfide liquid polymer (Thiokol rubber) produced by Thiokol Chemical Corporation, Trenton, New Jersey.

In the above formulation, the primary function of the different materials forming the binder have been indicated. However, it is to be understood also that the various compounding ingredients may perform other functions as well as the principal function as indicated by the term used to describe the various ingredients. Furthermore, one skilled in the art will understand that other materials can be employed which will perform the function of these various ingredients. The magnesium oxide employed in the formulation acts primarily as a smoke depressant whereas the iron oxide serves as a burning rate catalyst. However, these materials also perform other functions, e.g., they act as heat carriers as well.

The various ingredients in the sustainer composition may be mixed on a roll mill or an internal mixer such as a Banbury or a Baker-Perkins dispersion blade mixer may be employed. The sustainer can be formed in any desired shape by compression molding, injection molding, or extrusion. The curing can be accomplished at room temperature, but the overall cure time can be reduced by heating at a temperature in the range of 100° to 180° F. It is also within the scope of the invention to pour the mixed ingredients of the sustainer composition into the inner cavity of the igniter assembly and effect the cure in place at ordinary temperatures.

Referring again to Figure 2 of the drawing, a perforated container 44, such as a wire basket, is attached to the inner end of the igniter plug. As illustrated, this attachment is accomplished by welding or brazing the container to a ring member 46 which in turn is held in place on the igniter plug by means of wire 47. The perforations in container 44 are closed by dipping the container into a rubber solution or by coating with plastic material such as cellulose acetate plastic molding compound or other suitable covering material which will rapidly soften or rupture upon being subjected to heat. For a more complete description of the wire basket and covering materials which can be employed, reference can be had to copending U.S. application Serial No. 605,904, filed August 23, 1956, by O. D. Ratliff. An igniter material is disposed within the container in contact with the ignition sustaining material. The igniter material is preferably in granular or pelleted form and is held firmly in place within the container and against the ignition sustaining material by means of a thin layer of material 51, such as cotton, placed in the end of the container. While it is not intended to limit the invention to any particular igniter material, and any suitable material can be utilized, e.g., black powder, an especially useful igniter material is disclosed in copending U.S. application Serial No. 592,995, filed June 21, 1956, by L. G. Herring. As disclosed in the Herring application, the igniter composition is formed of a plurality of discrete pellets comprising powdered metal, powdered oxidizing material, and a binding agent, ethylcellulose.

An electrical conductor or contact member 52 extends through a central portion of plug 37 and ignition sustaining material 43. One end of the contact member terminates exteriorly of the outer face of the plug while the other end extends into the igniter material disposed within container 44. A pair of electrical ignition means 53, which can be squibs, electrical matches, or other suitable ignition means, are disposed within the perforated container in contact with the igniter material therein. Electrical leads 54 which are connected to the squibs are further attached to contact member 52 by means of a bolt 55 threaded into the end of that member. The squibs are grounded to the plug by means of electrical leads 56 which are connected to the igniter plug by means of bolts 57. Contact member 52 is prevented from contacting plug 36 by means of insulating member 58. The outer end of contact member 52 is provided with threads 61 upon which there is threaded a nut 62 for holding in place the contact member as well as insulating member 58. Insulating washer 59 is disposed between outer face 41 of the plug and nut 62 to prevent contact between these two elements. Electrical lead 63 has one of its ends connected to contact member 52 by means of a circular contact 64 which fits over the end of the contact member. Contact 64 is held in place by means of a nut 66 threaded onto the end of contact member 52. The other end of electrical lead 63 has a plug 67 connected thereto to furnish means for connecting the igniter assembly to a source of electrical current. Attached to the outer face of the igniter plug is a ballstud 68 to which plug 67 is attached when disconnected from the source of electrical current. A cover 69 fits into the outer recessed portion of the igniter plug, thereby covering the outer end of contact member 52 and electrical lead 63 connected thereto. When it is desired to place the rocket motor in readiness for firing, cover 69 is removed after which plug 67 is detached from ballstud 68 and plugged into an electrical circuit which includes a source of current, such as a storage battery.

In the operation of the rocket motor shown in the drawing, the motor is armed by removing cover 69 from the igniter assembly and connecting plug 67 of electrical lead 63 into an electrical circuit, not shown, which includes a source of power. Upon closing of a suitable switch, electrical current flows to squibs 53 through electrical lead 63, contact member 52 and electrical leads 54. On being supplied electrical current, the squibs function in a manner well known in the art to ignite igniter material 49 with which they are in contact.

The igniter material in burning forms hot combustion gases which leave container 44 through the perforations. It is to be understood that the plastic or rubbery material covering the perforations is softened and ruptured upon being contacted with the hot gases. The combustion gases resulting from the burning of the igniter material enter combustion chamber 19 of the rocket motor, thereby establishing a desired working pressure therein and initiating the combustion of the burning surfaces of the solid propellant. Depending upon the type of igniter material used, sufficient material is utilized so as to provide a working pressure of about 1000 p.s.i. in the combustion chamber during the first 150 milliseconds. However, it is not intended to limit the invention to any particular chamber pressure although it is usual to design a rocket motor which operates at a certain predetermined operating pressure. In the case of JATO units, the chamber pressure may be in the range of 200 to 1500 p.s.i., preferably between 600 and 1000 p.s.i. It has been found that the igniter material alone is ineffective in establishing a hot zone below the burning surfaces as is required for a steady combustion of the propellant charge. Establishment of this zone by the normal process of burning the propellant charge wherein relatively cool gases are produced requires from 0.5 to 1.0 second and longer with the result that the pressure initially developed will be too low. This difficulty encountered when employing conventional igniters is overcome in accordance with this invention by providing an igniter assembly which includes an ignition sustaining material in addition to the igniter material conventionally used.

Since the igniter material is in contact with the ignition sustaining material, ignition of the former results also in the ignition of the sustainer. The burning of the sustainer produces hot gases which are directed over the propellant burning surfaces during a period of time in excess of that required for burning of the igniter material. For example, while the igniter material may burn for about 150 milliseconds, the sustainer generally burns for a period of about 500 milliseconds. It is to be understood that the length of the burning period of the sustainer can be controlled by varying the sustainer composition used as well as by altering the amount of the sustainer employed. In the case of JATO units, however, it has been found that a sustainer which burns for about 500 milliseconds furnishes the hot combustion gases necessary to provide sufficient heat to maintain the required hot zone below the burning surfaces. The burning of the sustainer also provides additional combustion gases which make up for the deficiency in chamber pressure until stable burning surfaces have been established and equalized. Furthermore, use of the sustainer of this invention makes it possible to employ an igniter material which has a brisance of a lower level than customarily found in the prior art igniters. Accordingly, the ignition of a propellant charge by means of the igniter assembly of this invention is not characterized by an explosive-type combustion as frequently occurs with conventional igniters. This is an important advantage because the shock produced by conventional igniters often damages structural and functional parts of the motor and sometimes causes some disintegration of the solid propellant charge.

Blow-out disk 17 is ejected from the rocket motor through the nozzle passageway when the chamber pressure is in excess of about 200 p.s.i. Thereafter, the combustion gases formed by burning of the propellant charge leave the combustion chamber through nozzle 14, thereby imparting thrust to the rocket motor. By proceeding in accordance with the instant invention, it has been possible to provide a rocket motor in which the thrust developed is substantially uniform throughout its firing period.

A more complete understanding of the advantages obtained when employing the igniter assembly of this invention can be had by referring to Figure 3 of the drawing. This figure shows graphically the chamber pressure (p.s.i.) in the combustion chamber of a rocket motor, such as a JATO unit, during the ignition period and thereafter. As indicated in the figure by the broken line, the motor has a desired operating pressure of 1000 p.s.i., but it is to be understood that the invention is not limited to any specific pressure. Curve A represents the variations in chamber pressure occurring during ignition of the propellant and thereafter when using an igniter assembly provided with an igniter charge but without a sustainer charge. Curve B, on the other hand, shows the pressure changes occurring when the igniter assembly includes an ignition sustainer charge as described herein. It is noted that during the first part of the ignition period the two curves are shown as coinciding.

Now considering curve A only, it will be seen that chamber pressure is raised to about 1200 p.s.i. in around 50 milliseconds. The blow-out disk is ejected from the rocket motor nozzle when the chamber pressure is somewhere in excess of 200 p.s.i., e.g., at a pressure between 200 and 600 p.s.i. Since the propellant charge commences to burn as a result of the ignition of the igniter material, the pressure in the combustion chamber is dependent upon combustion gases resulting from the combustion of both the propellant charge and the igniter material. It is necessary to use sufficient igniter material to obtain an initial pressure substantially above the desired operating pressure in order to obtain subsequently a chamber pressure approaching the desired operating pressure. At the end of about 150 milliseconds, all of the igniter material is consumed so that pressure in the combustion chamber is thereafter dependent solely upon the combustion gases generated by the burning of the propellant charge. It will be seen that after a maximum pressure of about 1200 p.s.i. is attained, the chamber pressure decreases rapidly to below the desired operating pressure, i.e., to below 900 p.s.i. This is caused by the failure to establish a hot zone adjacent the propellant burning surfaces so that as a result the linear burning rate and concommitantly the mass burning rate of the propellant charge decreases, and the amount of combustion gases formed are less than the amount required to maintain the desired operating pressure.

Because of the slowing down of the linear burning rate, however, the burning surfaces remain in contact with the combustion gases for a longer time, thereby allowing sufficient time for heat to be conducted below the surface of the propellant charge. Because of this below surface heating, the linear burning rate increases, causing the formation of an increased amount of combustion gases and the development of a chamber pressure in excess of the desired operating pressure as shown at point 71 on curve A. However, as the burning continues, the hot zone which was formed is consumed, and the propellant surfaces now undergoing combustion are cooler, thereby again causing a decrease in the mass burning rate. As a result, the chamber pressure again falls below the desired operating pressure as shown at point 72 on curve A. These fluctuations in pressure above and below the desired operating pressure continue until such time as the pressure is finally lined out, after which the chamber pressure remains at approximately the desired operating pressure. However, it will be apparent that until stable burning surfaces have been established and equalized, the fluctuating pressure produced has an adverse effect upon the operating characteristics of the rocket motor, particularly with regard to the non-uniform thrust produced during the early part of the firing period. Furthermore, in some cases, a misfire may result if the chamber pressure should decrease to an excessively low pressure, e.g., below about 200 p.s.i., as a result of insufficient propellant burning surfaces being ignited.

Referring now to curve B of Figure 3, it is seen that the chamber pressure is raised initially to a pressure which is substantially equal to the desired operating pressure. This pressure is dependent upon the gases generated from the burning of the igniter charge, the sustainer charge, and the propellant charge. As a result of the combustion of the ignition sustainer charge, hot combustion gases are directed over the burning surfaces of the propellant charge during the initial 500 milliseconds of the firing period, thereby setting up the hot zone required for stable combustion of the propellant charge. Furthermore, the combustion gases formed by the burning of the sustainer charge compensate for the deficiency in chamber pressure until stable burning surfaces have been established and equalized at which time combustion of the propellant charge alone furnishes the combustion gases necessary to maintain the desired operating pressure. Thus, the linear burning rate, which is dependent upon the chamber pressure, and the mass burning rate remain substantially constant during the entire firing period. It will be noted that there are very slight fluctuations in pressure during the initial part of the firing period, but such fluctuations are small as compared to those occurring when the sustainer charge is omitted from the igniter assembly. Furthermore, since the chamber pressure is substantially uniform, it is possible to operate the rocket motor so as to obtain a uniform thrust throughout the firing period. Utilization of an igniter assembly which includes the sustainer of this invention also results in the elimination of misfires.

Example

A large number of tests were conducted in which a rocket motor was test fired when secured to a stationary test stand. In one series of tests, an igniter assembly which did not include the sustainer material of this invention was used to ignite solid propellants comprising ammonium nitrate and a rubbery binder material. When employing this type of igniter assembly, two misfires were experienced in 15 firings with the propellant charge being at −75° F.

Several hundred test firings were also carried out in which a rocket motor was provided with an igniter assembly similar to that illustrated in Figure 2. The igniter included, in addition to the igniter material employed in the igniter assembly used in the first series of test firings described above, 60 grams of a sustainer material. The sustainer charges used in these tests had the following composition: (1) from 50 to 75 weight percent potassium perchlorate (100–250 mesh); (2) from 5 to 25 weight percent aluminum (250–325 mesh); and (3) from 10 to 40 weight percent polysulfide polymer binder. Examples of specific formulations of sustainers used in the test firings are set forth below in the table.

TABLE

|  | Parts by Weight | | | | | |
|---|---|---|---|---|---|---|
|  | A | B | C | D | E | F |
| LP-3 [1] | 21.6 | 31.2 | 24.8 | 16.4 | 20.8 | 36.5 |
| Diphenyl guanidine (accelerator) | 0.6 | 0.9 | 0.7 | 0.5 | 0.6 | 1.1 |
| p-Quinone dioxime (curing agent) | 1.5 | 2.2 | 1.7 | 1.1 | 1.3 | 2.6 |
| Di-(butoxyethoxyethoxy)-naphthene (plasticizer) | 1.1 | 1.6 | 1.2 | 0.8 | 1.0 | 1.8 |
| Sulfur | 0.1 | 0.2 | 0.1 | 0.1 | 0.1 | 0.4 |
| Carbon black (filler) | 2.2 | 3.1 | 2.5 | 1.6 | 0.5 | 3.6 |
| MgO | 0.2 | 0.3 | 0.2 | 0.2 | 0.2 | 0.4 |
| $Fe_2O_3$ | 0.3 | 0.5 | 0.4 | 0.2 | 0.5 |  |
| Aluminum | 7.1 | 5.9 | 16.4 | 10.7 | 6.0 | 3.6 |
| $NH_4ClO_4$ |  | 16.7 | 52.0 |  |  |  |
| $KClO_4$ | 65.3 | 34.4 |  | 68.4 | 69.0 | 50.0 |

[1] A polysulfide liquid polymer (Thiokol rubber) produced by Thiokol Chemical Corporation, Trenton, New Jersey.

The igniter assembly ignited the solid propellant over the temperature range of −75° to 170° F. The average total ignition delay ranged from 220 milliseconds at −75° to 110 milliseconds at 170° F. with good reproducibility. No misfires were experienced in over 400 test firings.

It will be apparent that various modifications and variations of the instant invention can be made by one skilled in the art upon consideration of the foregoing disclosure. Such modifications and variations are believed to come within the spirit and scope of the instant invention.

I claim:

1. An igniter assembly for a rocket motor comprising, in combination, an igniter plug having a countersunk inner face, thereby forming a cavity in the inner end of said plug; ignition sustainer material disposed within said cavity; a perforated container attached to the inner end of said plug; igniter material disposed within said container and in contact with said ignition sustainer material; an electrical conductor member extending through a central portion of said plug and said ignition sustaining material, one end thereof terminating exteriorly of the outer end of said plug and the other end thereof terminating within said container; insulating material surrounding the portion of said conductor member within said plug; electrical ignition means disposed within said perforated container in contact with said igniter material; first electrical conducting means connecting the inner end of said conductor member to said ignition means; second electrical conducting means connecting said ignition means to said plug; and third electrical conducting means connected to the outer end of said conductors member.

2. An igniter assembly for a rocket motor comprising, in combination, an igniter plug provided with external threads and having countersunk inner and outer faces, thereby forming recessed portions in the ends of said plug; ignition sustaining material disposed within said inner recessed portion; a perforated container attached to the inner end of said plug; igniter material disposed within said container and in contact with said ignition sustaining material; an electrical contact member extending through a central portion of said plug and said ignition sustaining material, one end thereof terminating exteriorly of said outer face of said plug and the other end thereof terminating within said perforated container; insulating material surrounding the portion of said contact member within said plug; a pair of electrical ignition means disposed within said perforated container in contact with said igniter material; first electrical leads connecting the inner end of said contact member to each said ignition means; second electrical leads connecting each said ignition means to said plug; a third electrical lead having one of its ends connected to the outer end of said contact member; and electrical plug attached to the other end of said third electrical lead; means attached to the outer face of said igniter plug for holding said electrical plug when disconnected from a source of electrical current; and a cover attached to the outer end of said plug and encompassing said outer end of said contact member, said holding means, and said third electrical lead connected therebetween.

References Cited in the file of this patent

UNITED STATES PATENTS

| | | |
|---|---|---|
| 2,447,758 | Lubbock et al. | Aug. 24, 1948 |
| 2,455,015 | Mace | Nov. 30, 1948 |
| 2,524,591 | Chandler | Oct. 3, 1950 |
| 2,563,265 | Parsons | Aug. 7, 1951 |
| 2,627,810 | Catlin | Feb. 10, 1953 |
| 2,632,299 | Loughran | Mar. 24, 1953 |
| 2,685,837 | Sage et al. | Aug. 10, 1954 |
| 2,692,195 | Hannum | Oct. 19, 1954 |
| 2,696,710 | Golden | Dec. 14, 1954 |
| 2,697,325 | Spaulding | Dec. 21, 1954 |
| 2,703,960 | Prentiss | Mar. 15, 1955 |
| 2,740,702 | Mace | Apr. 3, 1956 |
| 2,791,962 | Terce | May 14, 1957 |